3,044,884
PRESERVATION OF FOODS

William E. Rader and Marvin Legator, Modesto, Calif., assignors to Shell Oil Company, New York, N.Y., a corporation of Delaware
No Drawing. Filed Nov. 7, 1960, Ser. No. 67,480
5 Claims. (Cl. 99—150)

This invention pertains to a method for the preservation of foods intended for human and/or animal consumption. The method of this invention effects the preservation of such foods by inhibiting growth of microorganisms in those foods.

The essence of the method for preserving foods provided by this invention is the discovery that the lower alkyl esters of 2-haloacetoacetic acids effectively inhibit and prevent growth and development of microorganisms which cause deterioration of foods. These esters of course have the formula:

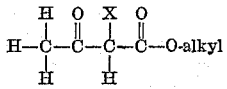

wherein alkyl represents the lower alkyl group and X represents halogen. Because they appear to be the most effective biocides, the esters of the kind wherein the alkyl group contains up to four carbon atoms, and X represents a middle halogen—that is to say, bromine or chlorine— are preferred.

The method of this invention thus comprises bringing into close association with a food subject to attack by and deterioration due to microorganisms a minor but effective amount of at least one lower alkyl ester of a 2-haloacetoacetic acid.

These microbiocidal esters also possess the other requirements for a useful food preservation additive—that is, they are not toxic to the human or animal consuming the food at the concentrations required to preserve the food and they do not adversely affect the palatability of the food. Further, these esters are volatile, so that they will be removed completely from the food during cooking. Still further, they are believed to be converted in the metabolic processes of humans and animals to innocuous products, which are excreted with other wastes. These esters are essentially neutral compounds and do not modify significantly the pH of the food products treated with them.

The method of this invention has been found to be primarily of value in the preservation of proteinaceous and/or fatty food products, such as meats, fish, shellfish, cheese—both the cured or ripened cheeses such as Cheddar cheeses and the fresh cheeses such as cottage cheeses, and the process cheeses such as cheese spreads, "Philadelphia" brand and other cream cheeses—and the like.

As will be demonstrated hereinafter, these 2-haloacetoacetic acid esters are highly active against a broad spectrum of microorganisms, including bacteria, yeasts, fungi and actinomycetes, and retain this activity in the presence of organic materials such as foods. The method of this invention thus provides protection of food products against attack by bacteria, yeasts, and fungi. These esters are particularly active against fungi, concentrations of as little as 5 parts per million by weight of the portion of the food to be protected providing protection against attack by fungi in many cases. In the case of bacteria, actinomycetes and yeasts, somewhat higher concentrations of the microbiocidal ester is usually required; even here, though, in some cases a concentration of the microbiocide of as little as 10 parts per million has provided protection against bacteria and actinomycetes. In the majority of cases, a concentration of the microbiocide in excess of about one percent will not be required. Ordinarily, a concentration of at least 50 parts per million is employed to insure adequate protection, but it will not often be found necessary to employ more than about one-half percent of the microbiocide to attain the protection desired.

These esters of haloacetoacetic acids are soluble to some extent in water, and can in many cases be most conveniently and effectively applied in the form of solutions in water. These esters readily disperse in water, so that a solution-dispersion of the esters also can be used. If desired, suitable edible emulsifying agents can be added. These esters also are soluble and/or readily dispersible in other materials, such as vegetable oils, fats and the like, and can be applied in the form of solutions or dispersions in these media. The esters also can be incorporated in gelatin, algae, pectins or the like. If desired, the esters can be dissolved in water, the solution frozen, and the frozen solution used in packing the food product. Higher concentrations of the esters can be obtained by their dispersal as well as their solution in the water used to form the ice. Solid compositions containing the esters can be obtained by intimately mixing the esters with finely divided edible solids, such as milk solids, flours and the like.

Any suitable and convenient technique can be used to attain and insure the necessary intimate association of the esters and the food products to be protected. Thus, the esters can be incorporated into the food products, as by mixing the esters with the food products. For example, hamburger, sausage and other ground meat products can be readily protected in this way. Where the food product is formed, and is essentially sterile, attack by microorganisms can be inhibited by coating the surface of the food product. To effect this coating, the food product can be dipped in a liquid or semi-liquid composition of the esters, or washed or sprayed or painted with such a liquid or semi-liquid composition, or it can be dusted with a solid composition containing the esters. The esters can be incorporated in or on materials used for wrapping the food products—paper, parchment, cloth or other porous materials used for wrapping or gelatinous materials used for coating the food products can be impregnated with the esters, and foil or plastic films and other non-porous wrapping materials can be coated with the esters. Since the esters are volatile, they may be introduced into sealed packages to provide the necessary ester concentration in the gas surrounding the food product. Either the liquid or the gaseous esters can be so used.

The effectiveness of the lower alkyl esters of 2-haloacetoacetic acids for the preservation of food products by inhibiting the growth and development of microorganisms which cause deterioration of those food products is strikingly demonstrated by the following tests, and the results obtained therefrom.

First, in vitro tests were conducted to ascertain the nature of the microorganisms which these esters would control. The tests were conducted using methyl 2-chloroacetoacetate, a typical species of these esters. The effectiveness of these esters in controlling a wide spectrum of microorganisms is shown by the results of these tests, which are set out in the following table:

*Table I*

| Type of Organism | Name of Organism | Concentration of Test Compound in parts per million by weight for control of organism |
|---|---|---|
| Bacterium | Bacillus subtilis | 40 |
|  | Pseudomonas putrefaciens | 20 |
|  | Mycobacterium phlei | 10 |
|  | Pseudomonas aeruginosa | 10 |
| Fungus | Saccharomyces cerevisiae | 5 |
|  | Chaetomium globosum | 10 |
|  | Penicillium italicum | 10 |
|  | Rhizoctonia solani | 10 |
|  | Helminthosporium turcicum | 5 |
|  | Botrytis allii | 5 |
|  | Lenzites trabea | 40 |
|  | Polyporus tulipifera | 5 |
| Actinomycetes | Streptomyces scabies | 20 |

Methyl 2-chloroacetoacetate also was found to destroy yeast.

In more direct tests, methyl 2-chloroacetoacetate was examined for its effectiveness in actually preserving food products.

In one series of tests, methyl 2-chloroacetoacetate was compared to oxytetracycline in the preservation of hamburger (ground beef). In these tests, chunks of fresh hamburger were dipped for three minutes in solutions of the test materials. The chunks of meat then were drained and sealed in Petri dishes and stored at laboratory temperature. As a check, untreated hamburger was subjected to the same procedure. After an incubation period of 16 hours the treatments were rated as to odor. In addition, small aliquots were suspended in methylene blue solution and decolorization time noted to determine the numbers of organisms present. Table II summarizes the data from one such test:

*Table II*

| Test Compound | Concentration in parts per million by weight | Odor rating | Time in minutes for methylene blue decolorization |
|---|---|---|---|
| Methyl 2-chloroacetoacetate | 50 | Normal | 135 |
| Oxytetracycline | 50 | do | 135 |
| None (control) | | Foul | 45 |

The ester thus compared favorably with oxytetracycline for control of microorganisms on the meat.

Fish also were treated with a three-minute dip in a similar series of tests. Readings were taken following an incubation period of 48 hours in the refrigerator and 12 hours at room temperature. The results:

*Table III*

| Test Compound | Concentration in parts per million by weight | Odor rating |
|---|---|---|
| Methyl 2-chloroacetoacetate | 50 | Normal. |
| Oxytetracycline | 50 | Do. |
| None (control) | | Foul. |

Again, the ester compared favorably with oxytetracycline.

To test the ester as a fungicidal fumigant, pieces of bread and cheese were placed in plastic bags. The ester then was added to the bag and the samples placed at laboratory temperature. Readings were taken ten days later. The results:

*Table IV*

| Quantity of chemical in bag | Rating on Cheddar Cheese | Rating on Bread |
|---|---|---|
| None (control) | Moldy | Moldy. |
| 500 micrograms | Normal | |
| 1 milligram | | Normal. |

From these data, is it apparent that the ester is a highly effective fungicidal fumigant.

*Preservation of shrimp.*—The efficacy of the microbiocides of this invention for preserving shrimp was demonstrated as follows:

Fresh shrimp were placed in the bottoms of Petri dishes, the test chemicals were added to glass planchets placed next to the shrimp and the dishes were sealed. After 20 days' storage at 4° C., the shrimp were homogenized and examined for organoleptic changes. The results:

*Table V*

| Test Compound | Concentration in parts per million by weight | pH of shrimp at end of test | Odor Rating | Reduction in number of bacterial colonies from number in nontreated control |
|---|---|---|---|---|
| Methyl 2-chloroacetoacetate | 400 | 7.5 | Normal | Some reduction. |
|  | 600 | 7.5 | do | Substantial reduction. |
|  | 800 | 7.5 | do | Marked reduction. |
| None (control) | | 8.0 | Foul | |

No unfavorable odors were imparted to the shrimp by the test chemical.

Methyl 2-chloroacetoacetate was also tested to determine its ability to preserve cheese. Fresh Cheddar cheese was sliced and the slices inoculated with a pore suspension of penicillium obtained from molded Cheddar cheese. The slices then were incubated at 15° C. for 24 hours to initiate mold growth. Following incubation, measured amounts of dilute solutions of the test chemicals were spread uniformly over the slices. The treated slices were then placed in Petri dishes alongside similar untreated but inoculated slices of the cheese and the slices incubated for 96 hours at 15° C. The effectiveness of the test compound for preserving the cheese was indicated by the percent of the surface of the cheese slice remaining free of mold. It was found that at a concentration of 100 parts per million by weight, the test chemical reduced mold by about 50% as compared to the control. This test is considered to be a very severe test, with all factors favoring growth of the mold. All of the control slices were overgrown with mold. It is evident that methyl 2-chloroacetoacetate is effective in controlling mold growth even under these very severe conditions. For comparison: the concentration of the ester was less than one-tenth that of the recommended standard, sorbic acid.

Cottage cheese is probably the most perishable of our common cheeses. Its microbiology follows quite closely that of the milk from which it is made and the starter used. Microbial spoilage can be attributed to molds and bacteria with the latter, specifically the lactobacilli, being the predominating spoilage organisms.

To determine the effect of methyl 2-chloroacetoacetate in controlling the spoilage of cheese, the following procedure was used:

Fresh small curd cottage cheese was purchased in ½ pint cartons. The cheese was removed from the carton, mixed thoroughly with a concentration of the test chemical and replaced in the carton. The cartons were incubated at 15° C.

At 24-hour intervals the cheese was examined for organoleptic changes, primarily sour odor. In addition to this determination, the resazurin dye test was run. This is a dye reduction test which is a measure of the bacteria in dairy products. It is carried out by adding 1/10 ml. of a 0.05 percent sterile aqueous solution of resazurin to 5 ml. of cottage cheese. The samples are then incubated in the dark at 37° C. for one hour. The dye changes from the original blue to violet, red, pink, and finally white, depending on the number of bacteria present. A blue color after one hour incubation usually indicates under 10,000 bacteria per gram, while the white color usually signifies 100,000,000 or more organisms per gram sample. The following results were obtained:

*Table VI*

| Compound | Concentration in parts per million by weight | Time in Hours after incubation | | Resazurin Test |
|---|---|---|---|---|
| | | Slight Souring | Sour | |
| None (control) | 0 | 48 | 72 | Pink 48 hrs. White 72 hrs. |
| Methyl 2-chloroacetoacetate | 10 | 96 | 120 | Pink 96 hrs. |
| | 25 | | 120 | Pink 120 hrs. |
| | 50 | | 120 | Pink 120 hrs. Red 120 hrs. |

The efficacy of the ester in extending the storage life of the cottage cheese is evident from the results of the tests.

Further, from the results of all of the tests which have been made, it is equally evident that the lower alkyl esters of 2-haloacetoacetic acids are effective food preservatives, combatting a very wide spectrum of microorganisms which ordinarily cause deterioration of foods.

Obviously, many modifications and variations of the invention as it has been set forth may be made without departing from the spirit and the scope of that invention, and therefore only such limitations should be imposed as are indicated in the appended claims.

We claim as our invention:

1. A method for preserving food products which comprises bringing a food product subject to attack by and deterioration caused by microorganisms into intimate contact with a microbiocidally effective amount of from 5 parts per million to one percent by weight of at least one lower alkyl ester of 2-haloacetoacetic acid.

2. A method for inhibiting the growth and development of microorganisms in food products which comprises bringing a food product into intimate contact with at least one lower alkyl ester of 2-haloacetoacetic acid, the amount of such ester being from 5 parts per million to one percent by weight sufficient to inhibit growth and development of microorganisms.

3. The method of claim 1 wherein the food product is a proteinaceous material.

4. The method of claim 3 wherein the ester is the methyl ester.

5. The method of claim 4 wherein the ester is methyl 2-chloroacetoacetate.

References Cited in the file of this patent

UNITED STATES PATENTS

| 2,434,507 | Mostek | Jan. 13, 1948 |
| 2,533,015 | Jasion et al. | Dec. 5, 1950 |
| 2,842,441 | Kuen | July 8, 1958 |